(12) United States Patent
Litherland et al.

(10) Patent No.: US 7,439,498 B2
(45) Date of Patent: Oct. 21, 2008

(54) METHOD AND APPARATUS FOR SEPARATION OF ISOBARIC INTERFERENCES

(76) Inventors: Albert Edward Litherland, 120 Rosedale Valley Road, Apt. 801, Toronto (CA) M4W 1P8; Jonathan P. Doupe, 607-1102 82nd Avenue, Edmonton (CA) T6G 0T1; William Edward Kieser, 561 Sammon Avenue, Toronto (CA) M4C 2E1; Xiao-Lei Zhao, 22 McCaul Street, Toronto (CA) M5T 3C2; Gholamreza Javahery, 4660 Aurora Rd, Kettleby (CA) L0G 1J0; Lisa Cousins, 9 Fontebella Ave., Woodbridge (CA) L4H 2A6; Ilia Tomski, 20 Benjamin Hood Crescent, Concord (CA) L4K 5M4; Charles Jolliffe, 93 Centre St., R.R.#3, Schomberg (CA) L0G 1T0

( * ) Notice: Subject to any disclaimer, the term of this patent is extended or adjusted under 35 U.S.C. 154(b) by 473 days.

(21) Appl. No.: 11/260,663

(22) Filed: Oct. 28, 2005

(65) Prior Publication Data

US 2006/0113464 A1    Jun. 1, 2006

Related U.S. Application Data

(60) Provisional application No. 60/622,617, filed on Oct. 28, 2004.

(51) Int. Cl.
*H01J 49/40* (2006.01)
*H01J 49/28* (2006.01)

(52) U.S. Cl. .................. 250/288; 250/282
(58) Field of Classification Search ............ None
See application file for complete search history.

(56) References Cited

U.S. PATENT DOCUMENTS

| | | | |
|---|---|---|---|
| 5,049,739 A * | 9/1991 | Okamoto | 250/281 |
| 5,386,116 A | 1/1995 | Kilius et al. | |
| 5,614,711 A * | 3/1997 | Li et al. | 250/287 |
| 5,783,823 A | 7/1998 | Mous et al. | |

(Continued)

OTHER PUBLICATIONS

Accelerator Mass Spectrometry for Measurement of Long-lived Radioisotopes, David Elmore and Fred M. Phillips, May 1, 1987, Science vol. 236, pp. 543-550.

*Primary Examiner*—David A. Vanore
(74) *Attorney, Agent, or Firm*—Hill & Schumacher; Lynn C. Schumacher

(57) ABSTRACT

This invention relates to a method and apparatus for separation of rare stable or radioactive isotopes from their atomic or molecular isobars in mass spectrometry (MS). In the present invention, the approach taken to removing atomic isobars utilizes a high transmission device for decelerating ions in combination with low energy reactions, such as ion-molecule reactions or near resonant electron transfer, in RF ion guides. The isobar is selectively depleted by electron transfer or other reactions between negative ions and gaseous targets in pressurized RF ion guides at low energies. The energy is controlled in such a way as to prevent reaction of the ion of interest while inducing reactions with the undesired isobar interference. The technique is of particular relevance to accelerator mass spectrometry (AMS) for which it allows substantial reductions in the necessary terminal voltage. The effect is to allow reductions in the size and cost of AMS installations.

86 Claims, 2 Drawing Sheets

U.S. PATENT DOCUMENTS

| | | | | |
|---|---|---|---|---|
| 6,140,638 A | * | 10/2000 | Tanner et al. | 250/282 |
| 6,259,091 B1 | | 7/2001 | Eiden et al. | |
| 6,627,912 B2 | * | 9/2003 | Bandura et al. | 250/582 |
| 6,630,665 B2 | * | 10/2003 | Tanner et al. | 250/306 |
| 6,713,757 B2 | * | 3/2004 | Tanner et al. | 250/288 |
| 6,799,355 B2 | * | 10/2004 | Guevremont et al. | 250/287 |
| 7,265,347 B2 | * | 9/2007 | Guevremont et al. | 250/287 |
| 2004/0026610 A1 | | 2/2004 | Abou-Shakra et al. | |

\* cited by examiner

METHOD AND APPARATUS FOR SEPARATION OF ISOBARIC INTERFERENCES

CROSS REFERENCE TO RELATED U.S APPLICATION

This patent application relates to, and claims the priority benefit from, U.S. Provisional Patent Application Ser. No. 60/622,617 filed on Oct. 28, 2004, which is incorporated herein by reference in its entirety.

FIELD OF THE INVENTION

This invention relates to a method and apparatus for separation of rare stable or radioactive isotopes from their atomic or molecular isobars in mass spectrometry, and more particularly the present invention relates to a method of reducing the intensity of the isobaric interference before accelerator mass spectrometry (AMS), and an accelerator mass spectrometer which incorporates the method.

BACKGROUND OF THE INVENTION

A general problem in mass spectrometry is the interference caused by isobars, which are atoms or molecules which have very nearly (substantially) the same mass as the atom or molecule being analyzed (the analyte). Such interferences occur in systems which analyze cations (positively charge ions), anions (negatively charged ions) or both.

Accelerator mass spectrometry (AMS) is the term often applied to a collection of techniques, based upon the use of negative ions, a tandem accelerator and mass spectrometry, that makes possible the measurement of isotopic ratios well below $10^{-12}$. The methods have been described, for example, U.S. Pat. No. 4,037,100 to K. H. Purser; A. E. Litherland, "Ultrasensitive Mass Spectrometry with Accelerators". Ann Rev Nucl. and Particle Sci., 30, pages 437-473, (1980). A recent review of AMS techniques, as applied to measurements of the concentration of long-lived isotopes, has been provided by Elmore, D and Phillips, F. M., "Ultra-sensitive Mass Spectrometry", Science, 296,543 (1987).

A central problem for AMS ultra-high sensitivity detection of rare stable or radioactive atoms is that there is generally an atomic isobar that has substantially the same mass as that of the rare atom to be analyzed (analyte atom). Even though these isobars have a different atomic number, and it might be expected they would be completely eliminated by careful chemistry, the sensitivity of AMS is so great that residual traces of the atomic isobars are often still present in the purified sample. Also, because the mass differences between isobars is extremely small, high transmission arrangements of dispersive electric and magnetic deflection fields seldom have the dispersion needed to provide isobar separation. Thus, the wanted rare ions and the isobaric background ions can pass unattenuated through the whole AMS system and into the final detector.

An example of the use of such an isobar problem is the measurement of the long-lived isotope $^{36}Cl$ present in underground aquifers. $^{36}Cl$ is introduced to the biosphere through spallation of $^{40}Ar$ by cosmic rays and can be used to derive the time a sample of water has been away from the surface. There are two stable isobars of the radioactive $^{36}Cl$ atoms: $^{36}Ar$ and $^{36}S$. Because it does not form negative ions $^{36}Ar$ is not a problem. However, $^{36}S$ is strongly electronegative and provides a troublesome background. Even after careful chemical separation the background count rates from the $^{36}S$ isobar may be many thousands per second compared to the wanted count rates of $^{36}Cl$ of a few per second or less.

The procedure presently used for eliminating this background is to accelerate the ions to an energy of at least 30 MeV and to use rate-of-energy-loss methods (dE/dx techniques), range methods, complete electron stripping or gas filled magnets to distinguish individual $^{36}Cl$ and $^{36}S$ events. To realize such energies requires the use of expensive nuclear physics accelerators operating at voltages between 6-10 million volts, with the larger voltage preferred when the ratio of $^{36}S/^{36}Cl$ is high. Such equipment is physically large, very expensive, is found only at major nuclear facilities and requires the services of a large professional staff for operation and maintenance. While isobar separation using these techniques is possible for lighter analyte ions, for the heavier ions, isobaric backgrounds often establish a significant limitation to ultimate detection limits.

A common and well-known use of accelerator mass spectrometry is analysis of small quantities of carbon 14 for carbon-dating purposes. Although requiring only moderate acceleration voltage for isobar removal, typically 500 kV-3 MV, $^{14}C$ AMS instruments are still large, complicated and expensive. Currently, important, new applications of $^{14}C$ analysis are being developed using these conventional AMS instruments. In particular, drugs labeled with $^{14}C$ tracers are dosed into human patients at very low levels of concentration, and are analyzed by AMS to determine their metabolic fate. This technique is called microdosing and is expected to have great impact on the approach to drug discovery and development.

Sputter ion sources are commonly used for AMS. They produce high current ion beams at moderately high energy, typically 20-30 kV, with an ion energy spread of tens of eV. Prior art approaches to isobaric separation for ion beams from near-thermal sources separate isobars from much lower velocity incoming beams. These approaches do not have the high sensitivity of AMS.

Compact microwave sources are also being developed for use with AMS systems as they produce large ion currents efficiently from gas phase sample materials. However, they only produce anions efficiently and so must be followed by a charge change canal to produce the anions required for $^{14}C$ isobar separation ($^{14}N$) and injection into the accelerator section of the accelerator mass spectrometer, with a resulting loss of efficiency See S-W Kim, R. J. Schneider, K. F. von Reden, J. M. Hayes and J. S. C. Wills, *Test of negative ion beams from a microwave ion source with a charge exchange canal for accelerator mass spectrometry applications*, Rev. Scientific Instruments 73 (2002) 846-848 and references therein.

Thus, there exists a need for a device to separate isobaric interferences using higher energy ion sources with few of the size, safety and cost disadvantages associated with the conventional AMS separation techniques. Such a device and method also would improve the sensitivity and usefulness of the mass spectrometer and have wide applicability and higher sensitivity than conventional methods that are commonly available.

SUMMARY OF THE INVENTION

This invention relates to a method and apparatus for separation of rare stable or radioactive analyte isotopes from their atomic or molecular isobars in mass spectrometry (MS). This method and apparatus are also applicable to the case where the analyte isotope is contained in a molecule which is selected for analysis by MS. In the present invention, the approach taken to removing isobars utilizes a high transmission device for decelerating ions in combination with low energy reactions, such as ion-molecule reactions or near resonant electron transfer, in radio-frequency (RF) ion guides. The isobar is selectively depleted by electron transfer, molecular fragmentation, or other reactions between ions and gaseous targets in pressurized RF ion guides at low energies. The energy is controlled in such a way as to prevent reaction of the radionuclide of interest while inducing reactions with the undesired isobar interference. When applied to AMS this technique allows substantial reductions in the necessary terminal voltage of AMS spectrometers. The effect is to allow reductions in the size and cost of AMS installations.

In one aspect of the invention there is provided a method for separation of analyte ions from isobars, comprising the steps of:
 a) producing an ion beam containing analyte ions;
 b) reducing a kinetic energy of ions in the ion beam to a pre-selected average kinetic energy;
 c) exposing the ion beam to a reactant gas chosen to selectively separate analytes from their isobaric interferences, by one of i) reacting said isobars present in the ion beam thereby depleting the isobars with respect to the analyte ions in the ion beam and ii) by reacting said analytes thereby shifting their mass-to-charge to a value away from a mass-to-charge value of said isobar; and
 d) detecting said analyte ions.

In another aspect of the invention there is provided an apparatus for separation of analyte ions from atomic or molecular isobar ions, comprising:
 a) a housing having an inlet and outlet, the inlet being for receiving a beam of ions;
 b) ion energy reducing means located downstream of said inlet in said housing for reducing an ion beam kinetic energy of said beam of ions passing there through to pre-selected kinetic energies; and
 c) a reaction cell located downstream of said energy reducing means, said reaction cell having an entrance for receiving said beam of ions, and an exit out which the beam of ions exits, said reaction cell containing a reactive gas chosen to selectively separate analytes from their isobaric interferences, by one of i) reacting said isobars present in the ion beam thereby depleting the isobars with respect to the analyte ions in the ion beam and ii) by reacting said analytes thereby shifting their mass-to-charge to a value away from a mass-to-charge value of said isobar.

The ion beam may contain radioactive isotope ions of $^{36}Cl^-$ and its atomic isobar $^{36}S^-$, and wherein the reactive gas is $NO_2$ and the reaction is the separation of the rare $^{36}Cl^-$ radioactive isotope from its $^{36}S^-$ atomic isobar, and wherein the reaction is

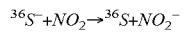

$$^{36}S^- + NO_2 \rightarrow ^{36}S + NO_2^-$$

for depleting the unwanted $^{36}S^-$ atomic isobar from the analyte ion beam.

The ion beam containing the $^{14}C$ analyte ions is produced by a compact microwave ion source. The cations of $^{14}C$ may originate from pharmaceuticals labeled with $^{14}C$ tracers are dosed into a human patient at very low levels of concentration in a process of microdosing, said $^{14}C$ being obtained from bodily fluids of the human patient.

BRIEF DESCRIPTION OF THE DRAWINGS

The method and apparatus to substantially reduce the intensity of the isobaric interference in accelerator mass spectrometry (AMS) will now be described, by way of example only, reference is made to the accompanying drawings, in which.

DETAILED DESCRIPTION OF THE INVENTION

Figure 1:
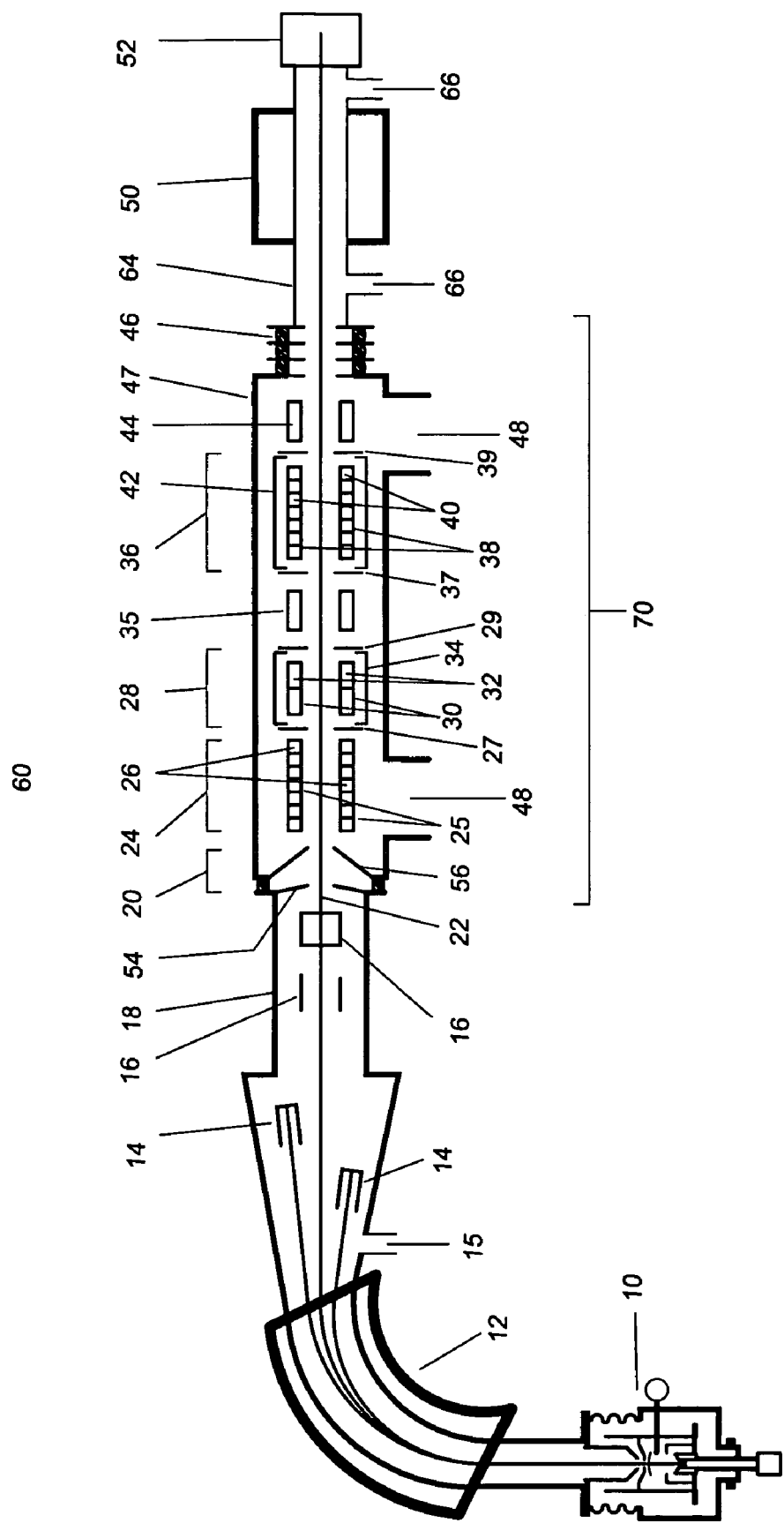
FIG. 1 shows an apparatus for separating isotopes by reducing the intensity of isobaric interference in accelerator mass spectrometry (AMS)

As used herein the phrase "analyte ions" means ions of interest to be analyzed using the method and apparatus of the present invention.

As used herein the phrase "isobar ions" or "isobaric interferences" refers to atoms or molecules which have very nearly (substantially) the same mass as the atom or molecule being analyzed (the analyte).

As used herein the phrase "ion beam kinetic energy" means the approximate average value of the kinetic energy of an ensemble of ions within the ion beam containing the analyte ions being analyzed.

The present disclosure describes a method and apparatus to substantially reduce the intensity of the isobaric interference while providing high transmission of the desired analyte ion. Application of the technique to mass spectrometry increases the sensitivity for the detection of the analyte ions. Its application to accelerator mass spectrometry also allows substantial reductions in the necessary terminal voltage of AMS spectrometers. The effect will be to allow reductions in the size and cost of AMS installations.

In the present invention, the method disclosed herein for removing isobars utilizes a high transmission device for decelerating ions in combination with low energy reactions, such as ion-molecule reactions or near resonant electron transfer in RF ion guides pressurized with reactive gas. The ion beam is first decelerated and thermalized (typically to near 300K) using a combination of electrostatic lenses and RF ion guides. The isobaric interference is selectively removed by reactions between ions and gaseous targets in pressurized RF ion guides. The reaction energy is carefully controlled by selecting the appropriate ion beam kinetic energy in such a way as to separate an isobaric interference from the analyte. This can be accomplished by preventing reaction of the analyte ion in a reaction cell, while inducing reactions with the undesired isobaric interference, depleting the concentration of the isobaric interference. It can also be accomplished by selectively reacting the analyte in a reaction cell, in such a way that the product of the reaction has a molecular mass-to-charge value substantially different from the isobaric interference. This approach can be incorporated into a smaller AMS system or another MS system with a suitable low dark current detector at a greatly reduced equipment size, cost and complexity, and it may be possible to build instrumentation with much lower voltage requirements, making it possible to use AMS in laboratories with substantially less expense.

Specifically, an intense ion beam formed by a high current ion source is generated and accelerated to high axial kinetic energy, typically 20-30 kV. Here axial kinetic energy refers to the value $\frac{1}{2}mv_z^2$ where m is the ion mass, $v_z$ is the ion velocity along the ion beam axis and z is the direction of the ion beam axis. Due to the nature of the mechanism of ion beam formation, the ion beam also acquires a substantial distribution in ion beam kinetic energy in all directions x, y and z where x and y are the directions transverse to the axis. For a cesium ion sputtering source, for example, the distribution in the ion beam kinetic energy tends to be large, on average on the order of 30 eV, with a large tail out to 100V.

After acceleration, the intense ion beam may be directed through an energy analyzer to select ions in with a narrow band of energies. The beam is then passed through a mass selector. This mass selector removes large quantities of the abundant isotopes from the analyte ion beam. The large axial kinetic energy and the large distribution of energies in the axial and transverse directions are then reduced to well-known and controlled values in order to selectively induce the ion reaction that removes the undesired isobaric interference from the desired analyte ion beam.

Ions are axially decelerated using a combination of electrostatic lenses, vacuum RF ion guides and pressurized RF ion guides. RF ion guides serve to contain the ions by causing them to oscillate about the ion guide axis. The electrostatic lenses provide the initial deceleration, on the order of tens of thousands of volts. The vacuum RF ion guide provides an RF containment field for the decelerated ions, and can be configured in such a way as to provide secondary deceleration, providing a kinetic energy reduction typically on the order of several kilo electron volts (keV). A subsequent RF ion guide, pressurized with non-reactive gas, positioned downstream from the vacuum RF ion guide, may be utilized to further reduce the ion beam kinetic energy. Here the axial and transverse kinetic energy of the ions, as well as their internal energy, may be reduced further via energy transfer collisions with the non-reactive buffer gas to near thermal energy (typically at 300K, although other temperatures may be used). Therefore the large distribution in kinetic energy of the initial beam can be reduced to very low values (on the order of kT, where k is the Boltzmann constant, and T is the ambient temperature), and the axial energy of the beam is well-controlled. By application of appropriate DC voltages to the ion guides, the kinetic energy of the ions as they exit the ion guide can be very carefully controlled.

This combination of electrostatic lenses and RF ion guides generates a series of stepwise drops in ion beam kinetic energy that yields minimum losses due to beam divergence, and therefore maximum transmission. This approach is particularly important for the deceleration and reaction of fragile ions, such as negative ions which typically have binding energies less than ten eV and therefore are susceptible to electron loss via energetic collisions with non-reactive buffer gas, or molecular ions that can readily fragment at higher energies.

Once decelerated, the ion beam (containing analyte ions and their isobaric interferences), is transferred into a reaction cell where the ions come into contact with pre-selected reactant gas. A reaction is selectively induced on the basis of the ion kinetic or internal energy, in order to remove the isobaric interference. Such reactions may include ion/neutral, ion/ion, or ion/electron reactions, and charge transfer, charge stripping, associative detachment, association, ion/electron, ion/positron, and collision-induced dissociation. The reactant may be atoms, molecules, electrons or positrons.

After the selective separation of substantially all of the undesired isobaric interference from the analyte in the reaction cell, ions may then be mass analyzed and detected in a suitable low dark current detector, or re-accelerated to complete their analysis in an AMS system In this way, a technique is developed for the separation of rare radioactive isotopes from their isobars. More specifically, one such technique is the separation of the rare $^{36}Cl^-$ radioactive isotope from its $^{36}S^-$ atomic isobar. Early work by Ferguson and co-workers serendipitously demonstrated that it is possible to selectively deplete $S^-$ over $Cl^-$ in the presence of $NO_2$ (Dunkin, D. B., Fehsenfeld, F. C., Ferguson, E. E., Chem. Phys. Lett. 15 257 (1972)); Fehsenfeld, F. C. and Fergusen, E. E. Plane. Space Sci. 16 701 (1968)). Both ions undergo charge transfer with $NO_2$ gas, but at different rates. The reactions are:

  (1)

  (2)

The reaction (2) for $Cl^-$ with $NO_2$ has a rate constant of $<6\times10^{-12}$ cm$^3$/s (endothermic by 1.34 eV) whereas the reaction (1) of $S^-$ with $NO_2$ is $1.3\times10^{-9}$ cm$^3$/s (exothermic by 0.2 eV). Therefore, by careful control and adjustment of the kinetic energy of the ions, it is possible to selectively react $S^-$ while remaining above the threshold for reaction of $Cl^-$. By substantially reducing the spread in kinetic energy of the ions within the beam, it is possible to selectively deplete unwanted isobars with high efficiency, while preserving high transmission of the analyte beam.

Another such technique is the separation of $^{14}C$ from isobaric interferences. For example, $^{14}C$ cations ($^{14}C+$) may be generated by a compact microwave source, and may be separated from an ion beam containing the isobaric interferences $^{14}N^+$, $^{12}CH_2^+$ and $^{13}CH^+$ using hydrogen as the reactant gas in the apparatus described in the first example. These isobars are eliminated by the following processes:

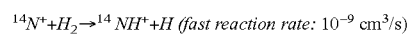

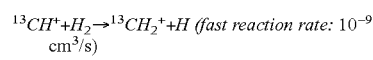

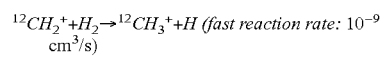

(see J. B. Marquette, C. Rebrion and B. R. Rowe, *Reactions of N+(3P) ions with normal, para and deuterated hydrogens at low temperatures*, J. Chem. Phys. 89(4) (1988) 2041-2047, and D. C. Clary, C. E. Dateo and D. Smith, *Rates for the reactions of open-shell ions with molecules*, in Chemical Physics Letters 167(1,2) (1990) 1-6) whereas the equivalent reaction with the analyte ions ($^{14}C^+$)

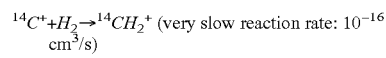

is seven orders of magnitude slower and would allow most of the analyte ions to pass unattenuated through the reaction cell.

This technique can be generalized to a range of analytes and their isobars. In addition to $^{36}Cl$ and $^{14}C$ analysis, for example, a similar reaction cell approach will have applications to the measurement of other rare analytes, including molecular ions.

Such an example is that of strongly bound super-halides ($MX_n^-$). $BeF_3^-$ and $CaF_3^-$ have high $F^-$ and electron binding energies, while by comparison the isobaric ions $BF_3^-$ and $KF_3^-$ are very weakly bound. Consequently the rare radioactive isotopes $^{10}Be$ and $^{41}Ca$ can be separated from the stable isotopes $^{10}B$ and $^{41}K$ using selective fragmentation of the weakly bound ion in a reaction cell. Other residual anions, also containing $^{10}B$ and $^{41}K$, will in general also be destroyed in the reaction cell, thereby making the detection of low levels of $^{10}Be$ and $^{41}Ca$ possible with small AMS accelerators. Selective reactions of other super-anions such as $MO_n^-$ are also possible.

Referring to FIG. 1, an accelerator mass spectrometer incorporating an isobar separator according to the present invention is shown generally at 60. The accelerator mass spectrometer 60 includes an ion source 10 which initially accelerates ions from the ion source to an energy $E_0$ (typically between 5 kV and 40 kV); a magnetic filter 12 downstream of source 10 for preferentially selecting ions having a preset mass number (mass/charge) among those ions generated by ion source 10, a set of off-axis Faraday cups 14 to intercept the beams of the abundant isotopes (e.g. $^{35}Cl$ and $^{37}Cl$) and to measure their currents, and a set of horizontal and a vertical steerer plates 16 for minor lateral and vertical adjustment of the beam position. The Faraday cups 14, steerer plates 16 and the following components labeled 24 through to 44 are located inside a vacuum enclosure, the housing of which is generally indicated as 18, which is pumped by high vacuum pump 15. If an excessive number of abundant isotopes, from tails in their energy distribution, are present in the desired analyte ion beam, an electric analyzer (not shown) to select mono-energetic beams may be added between source 10 and magnet 12. The vacuum within housing 47 is pumped by high volume vacuum pumps 48, connected to the housing 47 through electrically insulating pipes, to minimize the residual gas pressure in the housing and so reduce unwanted scattering of the ion beam.

The above described components are standard for accelerator mass spectrometers which are instruments that are commercially available from manufacturers such as High Voltage Engineering Europa B. V, Amersfoort, the Netherlands or National Electrostatics Corp., Madison, Wis.

The description of the modifications to mass spectrometers to effect the present invention, including standard accelerator mass spectrometers, hereinafter known as the isobar selector, shown generally at 70 in FIG. 1, is described hereinafter.

Isobar selector 70 includes a gap lens 20, with appropriate electrostatic potentials applied, is located in housing 47 downstream of steerer plates 16 and includes a conically-shaped electrode with sides 54 and 56 extending into the interior of housing 47. Gap lens 20 serves two purposes, the first being to reduce the axial kinetic energy of the ions from $E_0$ provided by the ion source 10 (to several hundreds of eV ($E_1$), and the second purpose being to focus the ions, by means of its conically shaped electrodes 54/56, so that ions decelerated across its potential are focussed towards the principal axis 22 and are prepared for injection into the following downstream stage. Gap lens 20 may be comprised of one or more lens electrodes. Gap lens 20 may be pumped through vacuum housing 18 by pump 15 and through housing 47 by pumps 48 or additional pumping may be used.

Isobar selector 70 also includes a decelerating RF ion guide 24 which is located downstream of gap lens 20. The purpose of ion guide 24 is to reduce the ion axial kinetic energy from $E_1$, as resulting from the energy reduction by the gap lens 20, to several electron volts ($E_2$). Exemplary ion guide 24 is comprised of 4, 6, 8 or more even number of rods (or poles) 25, symmetrically positioned about axis 22, to which electrostatic DC and RF potential is applied, with RF of alternating phase applied to adjacent rods, and includes one or more segments 26, formed by the electrode poles being segmented, each segment 26 being electrically isolated from the other segments. One or more segments 26 of guide 24 can be set to a different electrostatic DC potential in order to form a decelerating axial electrical field for decelerating ions travelling through guide 24 axially in the downstream direction along axis 22. While the set of DC potentials provides a decelerating field in the axial direction, the RF field generated by guide 24 provides the necessary ion confining potential field, whereby ions may oscillate about the axis 22 along the center of the segmented ion guide 24. Although a segmented multipole RF ion guide 24 is illustrated in FIG. 1, it is just only one possible embodiment, in addition, other configurations or geometries are possible, so long as a net decelerating axial field is produced along the axis.

Isobar selector 70 also includes a cooler 28 which is preferably (but not necessarily) a pressurized cell containing a non-reactive gas in which interactions with the ion beam in the pressurized cell preferably lead to thermalization of the ion energies. In addition to containing a non-reactive gas, cooler 28 is comprised of a segmented multipole RF ion guide including an even number of 4, 6, 8 or more rods 30 each of which includes one or more segments 32 each electrically isolated from all other segments 32 in the rod 30. Rods 30 are symmetrically positioned about axis 22, to which RF potential is applied as ion guide 24, and to which electrostatic DC potential is provided to segments 32 to define the reference potential of the ions in the ion beam, and to further control the ion beam kinetic energy.

The cooler 28 is comprised of rods 30 enclosed in an enclosure 34 in such a way as to contain the non-reactive gas. Non-reactive gas is delivered to cooler 28 through an inlet connected to the enclosure 34. In order to confine the non-reactive gas inside cooler 28, rods 30 are housed in the enclosure 34 confined by aperture plates 27 and 29 electrically isolated from enclosure 34, to which appropriate potentials are applied. Apertures in plates 27 and 29 are sufficiently small to prohibit most of the non-reactive gas from leaving enclosure 34. Aperture plates 27 and 29 are located at the ends of enclosure 34 aligned along axis 22 of housing 47 for ions to enter and exit RF ion guide 28. The pressure range in enclosure 34 is typically on the order of 1 to 100 mTorr.

As ions leave guide 24 they have an axial kinetic energy on the order of several to tens of electron volts. The distribution of ion kinetic energy in the transverse and axial directions also may be of the order of tens of electron volts. The general purpose of cooler 28 is to confine ions within the RF field while permitting ions to collide with the non-reactive buffer gas contained within the cooler to further reduce the total kinetic energy of the ions to near thermal energy (on the order of 3/2 kT, where k is the Boltzmann constant and T is the ambient temperature, typically at 300K). As ions collide with a non-reactive gas they transfer energy to the generally non-reactive gas and lose their kinetic energy until they come to a thermal equilibrium. Examples of non-reactive gas that may be used include noble gases such as argon, helium, xenon, etc., as well as highly stable diatomic molecules such as $N_2$, and stable polyatomic molecules such as $SF_6$ and the like. This reduction in ion energy due to collisions in RF fields as been well documented in Paul traps (Douglas and French, U.S. Pat. No. 4,963,736; R. E. March and J. F. J. Todd (Eds.), 1995, Practical Aspects of Ion Trap Mass Spectrometry: Fundamentals, Modern Mass Spectrometry Series, vol. 1. (Boca Raton, Fla.: CRC Press)).

In some cases it is desirable to control the kinetic energy of the ions inside the cooler 28, as well as the ion transmission through cooler 28. This can be done by setting two or more segments 32 of cooler 28 to a different electrostatic DC potential in order to form an accelerating electrical field to accelerate ions travelling through cooler 28 axially in the downstream direction along axis 22.

Exemplary isobar selector 70 also includes a reaction cell 36 located downstream of cooler 28. Reaction cell 36 is a pressurized cell, the main purpose of which is to confine and transmit ions efficiently while permitting the ions to interact with the reactive gas, in order to induce reactions that separate unwanted isobaric interferences from the analyte. Reaction cell 36 preferably includes a segmented multipole RF ion guide comprised of an even number of 4, 6, 8 or more rods 38, each rod including one or more segments 40 which is housed inside enclosure 42, with DC and RF voltages applied to rods 38 in a manner similar to cooler 28.

In order to confine the reactive gas inside reaction cell 36, rods 38 are housed in the enclosure 42 in a manner similar to rods 30 in enclosure 34, using aperture plates 37 and 39 that are electrically isolated from enclosure 34 and to which appropriate potentials are applied. Apertures plates 37 and 39 are located at the entrance and exit apertures of enclosure 42 aligned along axis 22.

Reactive gas is introduced to reaction cell 36 through an inlet connected to the enclosure 42. As reactive gas leaks out of reaction cell 36 through its entrance and exit apertures in plates 37 and 39, it is then pumped away immediately by pump 48. The pressure range here is also typically within 1 to 100 mTorr although higher or lower pressures may be used, depending on the nature of the reaction. The reactive gas may consist of $NO_2$ or a combination of buffer gas and reactive gas for selective transmission of $^{36}Cl$, or less specifically, any reactive gas that yields an appropriate reaction rate.

While such an enclosure 34 or 42 is cost-effective, other configurations are possible, for example rods 30 or 38 may be arranged and constructed in such a way as to be conductance limiting, reducing the need for apertures.

Now, turning specifically to the reaction in reaction cell 36, the thermalized ion beam enters reaction cell 36 with a preselected ion beam kinetic energy specific to a particular reaction. For example, in the above example of $$S^- + NO_2 \rightarrow S + NO_2^- \quad (1)$$

$$Cl^- + NO_2 \rightarrow Cl + NO_2^- \quad (2)$$

the two reactions (1) and (2) are very different. Reaction (1), exothermic by about 0.2 eV, occurs via a near-resonant charge transfer mechanism, and very little excess relative kinetic energy of collision partners $S^-$ and $NO_2$ is required for reaction to occur. Reaction (2), endothermic by about 1.34 eV, undergoes non-resonant charge transfer requiring a relative kinetic energy of collision partners Cl– and $NO_2$ near or above 1.34 eV.

Thus, in order to selectively deplete the sulphur anion, the relative kinetic energy is controlled such that sulphur and chlorine anions enter reaction cell 36 with relative kinetic energy substantially less than 1.3 eV, preferably less than 0.5 eV. Other reactions may vary by more or less energy.

The total kinetic energy of an ion of mass, velocity $m_i$, $v_i$ and of gaseous species of mass, velocity $m_g$, $v_g$ is $$E_T = \frac{1}{2}m_i v_i^2 + \frac{1}{2}m_g v_g^2 \quad (3)$$

Cast in terms of relative kinetic energy and centre-of-mass energy yields:

$$E_T = \frac{1}{2}\mu v_r^2 + \frac{1}{2}(m_i + m_g)v_c^2 \quad (4)$$

where $$\mu = \frac{m_i m_g}{(m_i + m_g)} \quad (5)$$

and the centre-of-mass velocity is $$v_c = \frac{m_i}{m_i + m_g}v_i + \frac{m_i}{m_i + m_g}v_g \quad (6)$$

Thus the relative kinetic energy available for reaction can be controlled by controlling the kinetic energy of the ion and the gas in the reaction cell 36. For the example above, the gaseous $NO_2$ is held near 300° C., and is nearly at rest relative to the incoming ion beam. The kinetic energy of the ion entering reaction cell 36 is controlled by controlling the electrostatic DC potential difference of the rods 30 of cooler 28 and rods 38 of reaction cell 36. Specifically, ions enter reaction cell 36 with an axial kinetic energy defined by an electrostatic DC potential difference between segments 32 of cooler 28 and segments 40 of reaction cell 36, and with a thermal kinetic energy distribution approximately determined by the ambient temperature of the non-reactive gas of cooler 28.

For example if the electrostatic DC potential on rods 30 is $E_1$ and the electrostatic potential on rods 38 is $E_2$, the lab frame kinetic energy of ions of single charge (z=1) in an ion beam is roughly ($E_1$–$E_2$) eV (more generally for ions of n charge, z=n, the lab frame kinetic energy is n×($E_1$–$E_2$)). In this way the relative kinetic energy may be tuned precisely to permit optimum selectivity. In some cases, minor variations in the kinetic energy may have a large impact, for example selecting reactions that vary by only a small difference in endothermicity. Therefore it may be useful to stepwise ramp the ion energy over a range, or in advance to calibrate the lab frame collision energy to the reaction of interest.

Control of the ion beam kinetic energy inside the reaction cell 36, as well as the ion transmission through reaction cell 36 can be done by setting one or more segments 40 of rods 38 to a different electrostatic potential in also a similar way as described above for the segments 26 of rods 25 in guide 24. This provides additional means to heating, for example to add internal energy to reactants prior to reaction.

The entrance and exit aperture plates 27, 29, 37 and 39 of enclosure 34, cooler 28 and enclosure 42 of reaction cell 36 may serve as entrance and exit lenses. These lenses may be used for optimizing ion transmission efficiency through cooler 28 and reaction cell 36.

Optionally, a time-varying potential may be applied to aperture plates 27, 29, 37 or 39 to provide a temporary repelling potential at the entrance and exit, in order to trap ions temporarily within enclosure 34 or 42. Optionally, time varying potentials also may be applied to one or more segments 32 of rods 30 in cooler 28 or to the segments 40 of rods 38 in reaction cell 36 to provide a temporary repelling potential within enclosure 34 or 42. Such electrostatic trapping of ions in ion guides is common in the art, and provides control of the residence time within an ion guide, for purposes including: enabling further control of the reaction time, or further manipulation of ions in the ion beam, for example in conjunction with additional mass-selective excitation means, or providing a pulsed ion beam at the exit.

For example a time-varying potential may be set on lens 37 and lens 39 to provide time to mass-selectively excite an ion in reaction cell 36. At first a potential may be applied to permit ions to enter enclosure 42 for a period of time, $\tau_1$. Then a potential is applied provide a repulsive electric field to decelerate or trap ions temporarily within enclosure 34 for a time $\tau_2$. During this time excitation methods, including mass-selective heating, mass selective ejection, or the like may be applied. Finally the potential may be set on lens 39 to accelerate ions toward, and then eject ions out, the exit of enclosure 34. The time-varying potential on plates 27 and 29 of cooler 28 can be synchronized to the time-varying potential on plates 37 and 39 of reaction cell 36, for example to provide maximum duty cycle.

Mass-selective excitation means using quadrupole RF ion guides are common in the art, including application of auxiliary frequencies in order to resonantly excite or eject ions of specific mass-to-charge ratio, or application of resolving DC potentials, and the like (Dawson P H (ed), Quadrupole Mass Spectrometry and Its Applications (American Institute of Physics Press, Woodbury, N.Y., 1995). These may be applied to rods 30 in cooler 28 or rods 38 in reaction cell 36 and provides benefits that include but are not restricted to mass-selective ejection, mass-selective collision-induced dissociation, or mass-selective RF heating, with or without the electrostatic trapping of the ions in cooler 28 or reaction cell 36, although trapping the ions is often preferable for best control of the residence time.

An additional ion guiding device 35 may be positioned between ion cooler 28 and reaction cell 36 to permit additional pumping between cooler 28 and reaction cell 36, shown preferably as a supplementary RF ion guide in FIG. 1, but it may also comprise a set of one or more electrostatic lenses. Exemplary isobar selector 70 may also include a mass selector (separator) 44. An ion beam exiting reaction cell 36 may still contain potentially harmful ions formed after the first mass analyzer, in any of the components downstream from the analyzer, including reaction cell 36, which may generate further interferences downstream of selector 70. Mass selector 44 filters ions of preset mass number and directs them to the following gap electrode 46 downstream of selector 44, where typically a pre-selected mass range is transmitted. Thus, molecular ions, such as hydrides, that could react downstream and disadvantageously form isobaric interferences, will be selected out.

Mass selector 44 provides selective transmission preferably by means of auxiliary excitation in a quadrupole RF ion guide, or RF/DC resolving quadrupole, although other forms of mass selective filters are possible. The theory of the mass selection in quadrupole RF ion guides is well known and such devices are widely used in practice (Dawson P H (ed), Quadrupole Mass Spectrometry and Its Applications (American Institute of Physics Press, Woodbury, N.Y. 1995). The principle of operation of these mass selectors is based on motion of charged particles in a quadrupolar field. This ion motion can be either stable or unstable based on several parameters, including the mass-to-charge ratio (m./z) of the ion, and the amplitudes of applied RF and DC voltages. For some applications, no further mass selection may be required after this stage.

RF ion guide 24, cooler 28, ion guiding device 35, reaction cell 36, and mass selector 44 are enclosed in vacuum housing 47 pumped by vacuum pumps 48, to obtain a pressure near $1\text{-}10\times10^{-5}$ Torr. Higher pressures are possible if additional pumping is used downstream and upstream of selector 70.

It will be obvious to those skilled in the art that the multipole RF ion guide geometry in segmented ion guide 24, cooler 28, reaction cell 36 and mass selector 44 may be varied from that illustrated in FIG. 1, while providing a similar function. For example, the rods of the multipole RF ion guides may not be straight, but instead tilted or offset, in cases where steering the beam slightly toward a secondary axis may be advantageous. Each segment 26 of the rods 25 of segmented ion guide 24, and each segment 32 of the rods 30 of the segmented ion guide in cooler 28 may also have a different RF voltage level V applied thereto, to select the confinement potential, proportional to $V^2$, for different segments.

Although guide 24, cooler 28 and reaction cell 36 include segmented multipole RF ion guides as preferred embodiments, it will be appreciated by those skilled in the art that other geometries or configurations are possible that similarly contain ions in an RF field. For example, RF ion guides including a series of ring electrodes to which RF and DC voltages are applied, may be used. Ion funnels, comprised of a series of aperture plates of increasingly smaller internal diameter, may be used. A series of discs, rather than segments, arranged about an axis with applied alternating RF, may be used. It is also possible to control the ion energy through guide 24, cooler 28 or reaction cell 36 by providing means other than segments of rods, to provide an axial field, such as one or more segments of wires or wedges positioned between adjacent rods of the multipole, and the like.

It may be sometimes advantageous to further reduce or increase the energy available for the reaction, by further control of the kinetic or internal energy of the ions, molecules or atoms in the non-reactive and reactive gases. For example, enclosure 34 and 42 may contain refrigeration means to provide further cooling. As another example, enclosure 34 or 42 may contain a selective heating source, such as a laser or lamp source with frequency output matched to an internal mode of vibration or rotation of a molecular ion, or a non-selective heating source, such as a heating coil. Although the reactant is typically a neutral gas, it may be sometimes advantageous to use other reactants, including but not restricted to gaseous ions, photons, electrons, or positrons.

It may be sometimes advantageous to provide a precursor reaction means for introducing precursor reactions that may enhance the selective reactions in reaction cell 36. For example, in order to induce or enhance a reaction in reaction cell 36, a precursor reactant may be incorporated through an inlet attached to enclosure 34 or 42 of cooler 28 or reaction cell 36, including but not restricted to, electrons, ions, surfaces, photons, positrons, or additional gases. Similarly, reactants may be introduced to ion guiding device 35. It may be advantageous for isobar selector 70 to contain an additional reaction cell that serves as a precursor reaction cell to reaction cell 36.

Now, turning again to the application of conventional accelerator mass spectrometry, a series of gap electrodes 46 are located at the end of housing 47 to axially re-accelerate selected ions emerging from the reaction cell 36 and mass selector 44 to an energy suitable to match the acceptance of the accelerator and high energy analyzer section 50 of the accelerator mass spectrometer (typically 20-40 keV). The ion path through the accelerator and high energy analyzers, section 50, and leading to detector 52 is contained in a vacuum housing 64 and pumped by one or more vacuum pumps 66. The section of vacuum housing 47 between the gap electrode 20 and the series of gap electrodes 46 and all the components located within it (24 to 44) are held at an elevated negative DC electrical potential V near $-E_0$. The power supplies and control electronics for the segmented RF multipole ion guides 24, and those contained in cooler 28 and reaction cell 36 are referenced to this potential. They receive power through an isolation transformer and their control signals through fiber optic links.

As mentioned above, the vacuum within housing 47 is pumped by high volume vacuum pumps 48 to minimize the residual gas pressure in the housing and so reduce unwanted scattering of the ion beam. The ions then continue through the remainder of the accelerator mass spectrometer 50, which typically includes acceleration to energy $E_a$ (typically between 0.5 and 10 Mev), charge changing from negative to positive ions (typical charge state n where $1 \leq n < Z$, the charge on the nucleus), further acceleration to add energy of $n \times E_a$ and further electric and/or magnetic analysis.

The final element of the accelerator mass spectrometer is a gas ionization detector 52 which includes a chamber containing a low pressure gas and charge collection electrodes. When the selected ions enter detector 52 they generate an electronic charge proportional to the energy they lose in the gas. The signal resulting from the collection of this charge provides the indication if the presence of the ion and some identification information. It will be understood that accelerator mass spectrometers such as that shown generally at 60 in FIG. 1 may be produced incorporating isobar selector 70 directly when produced. Alternatively, existing accelerator mass spectrometers may be retrofitted to include the isobar selector unit 70. These units may be constructed as modules and retrofitted to existing mass spectrometers.

It will be appreciated by those skilled in the art that isobar selector 70 in combination with an ion detector may stand alone as a suitable mass spectrometer for some applications, or as a component in other mass spectrometer systems, including ion traps, single or triple quadrupole mass filter systems, magnetic sectors, ICR cells, or time of flight, and is not restricted to isobar selection in an accelerator mass spectrometer. Ion sources such as sputtering, compact microwave, inductively-couple plasma, matrix-assisted MALDI may be suitable.

It will be understood that while one embodiment for decelerating and thermalizing an ion beam is described above, the series of decelerating devices can be configured a number of ways. For example in some cases cooler 28 may not be necessary, if the reacting species do not require the large degree of thermalization in order to differentiate reactions, or if the gas in the pressurized reaction cell can be mixed with non-reactive gas in such a way as to ensure thermalizing collisions without impacting the reaction efficiency. Furthermore, for example where the ions in the initial ion beam are very hard to dissociate, it may possible to decelerate the ion beam efficiently without the requirement of ion guide 24. Additionally, it will be understood that in some cases, cooler 28 may not be pressurized, but instead be evacuated, providing an additional auxiliary ion guide prior to reaction cell 36. Mass selective means such as resonant excitation, boundary-activated excitation, or RF/DC filtering may be applied to evacuated cooler 28 to further pre-select an m/z of the ion beam. Mass selective means may also be applied to auxiliary precursor reaction cells and to ion guiding device 35.

More specifically, then, for separation of the rare $^{36}Cl^-$ radioactive isotope from its $^{36}S^-$ atomic isobar as discussed previously, $S^-$ can be selectively depleted over $Cl^-$ in the presence of $NO_2$ (the reactive gas contained in reaction cell 36), using a controlled ion beam kinetic energy, since both ions undergo charge transfer with $NO_2$ gas, but at different rates. The reactions, as given above, are:

  (1)

  (2)

The ion source 10 produces a beam of negative chlorine ions, as well as negative ions of any sulphur which may be present as a contaminant in the sample. These ions have energies $E_0$, typically between 20 and 40 keV. The magnet 12 separates the ions in the ion beam by mass, so that the abundant isotopes of chlorine at mass 35 and mass 37 are directed into the off-axis Faraday cups and the mass 36 ions are directed along the axis 22 of the isobar separator. Minor deflections in this ion beam are corrected by the horizontal and vertical steerer plates 16.

Next, the kinetic energy of the ion beam containing the $^{36}Cl^-$ radioactive isotopes and the isobaric interference $^{36}S^-$ is initially reduced in the gap lens 20 from $E_0$ to $E_1$, typically several kilovolts, and while this deceleration is occurring, the conical shape of the gap lens 20 focuses the beam onto the axis of the isobar separator at the entrance to the decelerator ion guide 24 reducing the kinetic energy of the ions at the exit to $E_2$, typically ~10 eV. As the ions still retain a distribution in their kinetic energy, they are directed through cooler 28, where both their axial and transverse kinetic energy distribution is reduced by controlled collisions with non-reactive buffer gas to energy $E_3$.

The ions then enter the reaction cell 36 where their lab frame kinetic energy $E_4$ is defined by the voltage difference between the downstream segments 32 of cooler 28 and the upstream segment 40 of reaction cell 36 and is pre-selected to yield a relative kinetic energy of approximately 0.5 eV. Sulphur negative ions undergo charge neutralization reactions with the nitrogen dioxide gas and are removed from the ion beam, while chlorine negative ions are not attenuated. The beam then enters the mass separator 44 with energy $E_5$ defined by the voltage difference between the downstream segment 40 in reaction cell 36 and mass selector 44. Here any other contaminant ions which either originated from the sample in the ion source 10 or were generated by secondary reactions in the reaction cell 36 are removed. The ions are then re-accelerated through the gap lenses 46 and are injected into the rest of the accelerator and high energy analyzer section 50 of the mass spectrometer.

Figure 2:
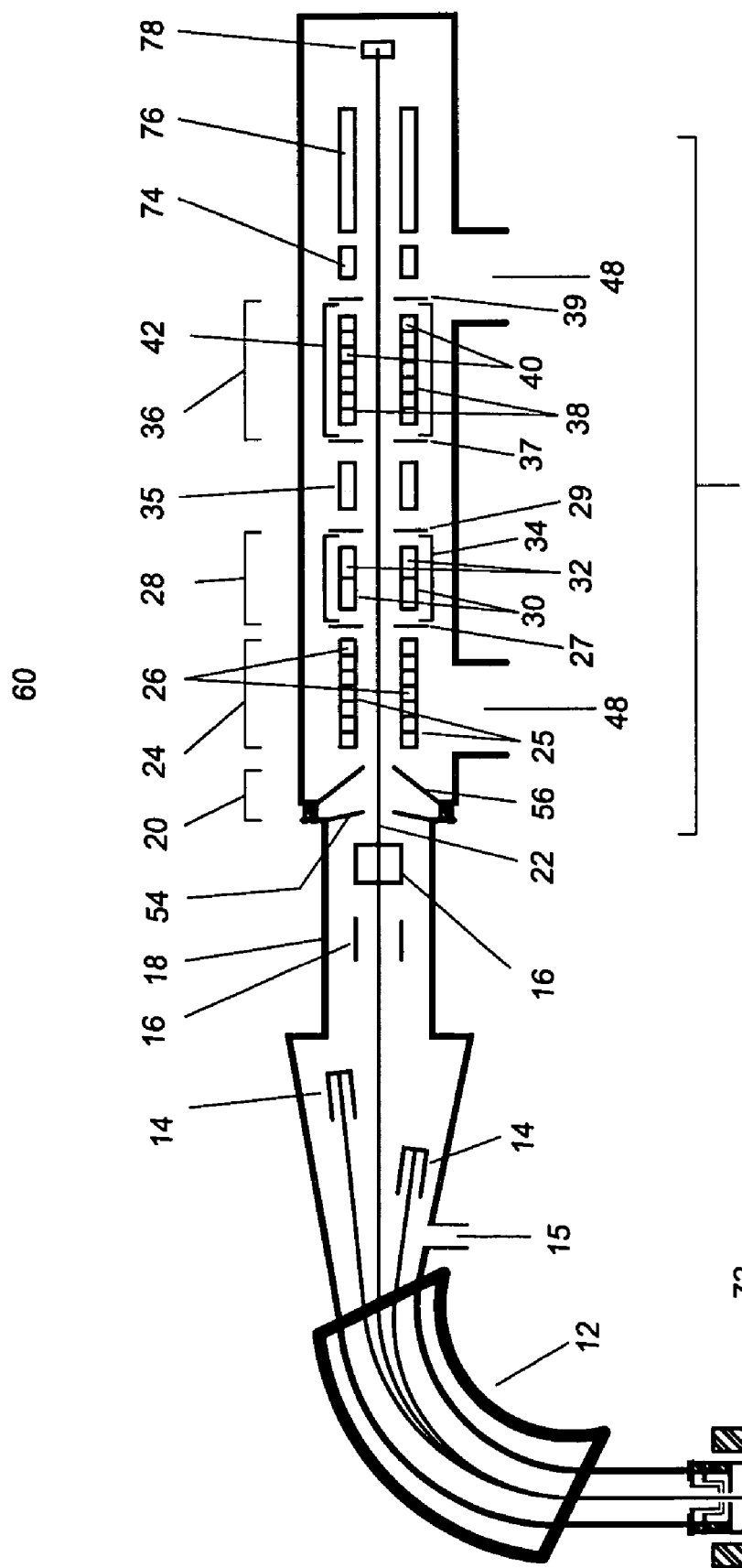
FIG. 2 shows an apparatus for separating isotopes by reducing the intensity of isobaric interference from high energy ion sources, using an ordinary quadrupole mass spectrometer analyzer downstream from the separator, followed by a suitable low dark current detector.

Section 50 removes any further molecular interferences and performs additional mass and energy analyses to remove fragments of such molecules. The rare ($^{36}Cl$) ions are then counted in the gas ionization detector 52. It will be appreciated that isobar selector 70 can be inserted upstream into various types of mass analyzers, including quadrupole mass filter, time-of-flight, quadrupole ion trap, orbitrap, magnetic sector, and fourier-transform ion cyclotron resonance. Selector 70 can also be coupled with a number of ion sources, such as sputtering, compact microwave, inductively coupled plasma, electrospray, matrix-assisted laser desorption ionization, electron cyclotron resonance, as long as the ion beam velocity and position entering the mass spectrometer are matched to the mass spectrometer acceptance criteria. For example, in device 600 in FIG. 2 isobaric separator 70 is inserted downstream of compact microwave ion source 72, producing a high energy beam of cations containing analytes and their isobars. Magnet 12 mass separates the ions, and stable isotopes are directed to the off-axis Faraday cups 14 while analyte and isobar ions are directed along axis 22, corrected by the horizontal and vertical steerer plates 16.

The ion beam kinetic energy is reduced using a combination of gap lens 20, decelerator ion guide 24, and cooler 28. The ions then enter the reaction cell 36 with a controlled ion kinetic energy, where isobars are selectively depleted. The transmitted analyte ions are then passed through a mass analyzer depicted here as RF quadrupole pre-filter 74 and RF quadrupole mass filter 76. Analyte ions are then detected by detector 78, comprised of an electron multiplier or a very low dark current detector, or, if necessary, components of a simplified single-ended (including a gas ionization detector mounted on a high voltage deck) or tandem AMS system.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for separation of analyte ions from atomic or molecular isobar ions, comprising:
   a) a housing having an inlet and outlet, the inlet being for receiving a beam of ions;
   b) ion energy reducing means located downstream of said inlet in said housing for reducing an ion beam kinetic energy of said beam of ions passing there through to pre-selected kinetic energies; and
   c) a reaction cell located downstream of said energy reducing means, said reaction cell having an entrance for receiving said beam of ions, and an exit out which the beam of ions exits, said reaction cell containing a reactive gas chosen to selectively separate analytes from their isobaric interferences, by one of i) reacting said isobars present in the ion beam thereby depleting the isobars with respect to the analyte ions in the ion beam and ii) by reacting said analytes thereby shifting their mass-to-charge to a value away from a mass-to-charge value of said isobar.

2. The apparatus according to claim 1 wherein said ion energy reducing means includes means for reducing the kinetic energy of the beam of ions having an initial kinetic energy in a range of 100 eV to 100 KeV.

3. The apparatus according to claim 1 wherein said ion energy reducing means includes means for reducing the kinetic energy of the beam of ions having an initial kinetic energy in a range of 10 KeV to 50 KeV.

4. The apparatus according to claim 1 wherein a mass separator is located downstream of an exit in the reaction cell and upstream of the outlet.

5. The apparatus according to claim 1 wherein the energy reducing means located downstream of said inlet in said housing includes a gap electrode across which an electric potential is applied for decelerating the ions.

6. The apparatus according to claim 5 wherein the gap electrode includes conically shaped electrode members located adjacent to said inlet, said conically shaped electrodes being positioned to focus the ions so that ions are decelerated across its potential towards an axis of the gap electrode, and wherein said ion beam is directed along said axis of the gap electrode.

7. The apparatus according to claim 1 wherein the energy reducing means includes a radio frequency (RF) ion guide, wherein the RF ion guide includes a voltage source to form a retarding axial electrical field for decelerating the ions in the ion beam travelling through the RF ion guide axially in the downstream direction, and wherein the RF ion guide produces an RF field for providing a confining potential field.

8. The apparatus according to claim 7 wherein the RF ion guide is a multipole RF ion guide.

9. The apparatus according to claim 8 wherein the multipole RF ion guide includes a pre-selected number of multipole ion guide segments, including a DC voltage source for applying a pre-selected electrostatic DC potential to each segment in order to form said retarding axial electrical field, and including an RF voltage source for applying an RF voltage to each multipole ion guide segment to produce said confining potential field.

10. The apparatus according to claim 1 wherein the energy reducing means includes a radio frequency (RF) ion guide located in an ion guide enclosure having an entrance and exit, wherein the RF ion guide includes a voltage source for applying a pre-selected electrostatic DC potential and an RF field to said ion guide for producing a confining potential, and wherein said ion guide enclosure contains a non-reactive gas.

11. The apparatus according to claim 10 wherein said enclosure includes a temperature controller for controlling a temperature of said enclosure for further control of said ion beam kinetic energy.

12. The apparatus according to claim 10 wherein said RF ion guide is a multipole RF ion guide.

13. The apparatus according to claim 12 wherein the multipole RF ion guide is a segmented multipole RF ion guide including a pre-selected number of multipole ion guide segments, wherein said voltage source includes a DC voltage source for applying a pre-selected electrostatic DC potential to each segment and said voltage source includes an RF voltage source for applying an RF voltage to each multipole ion guide segment to produce said confining potential field.

14. The apparatus according to claim 1 wherein said housing includes at least one guiding means located adjacent to said entrance of said reaction cell.

15. The apparatus according to claim 14 wherein said at least one guiding means is one of an electrostatic lenses and a multipole RF ion guide.

16. The apparatus according to claim 1 wherein the reaction cell includes a radio frequency (RF) ion guide located in a reaction cell, wherein the RF ion guide includes a voltage source for applying a pre-selected electrostatic DC potential and an RF field to said ion guide for producing a confining potential field.

17. The apparatus according to claim 1 wherein reaction cell includes a temperature controller for controlling a temperature of said enclosure for further control of said ion beam kinetic energy.

18. The apparatus according to claim 1 wherein said reaction cell is provided with means for introducing additional reaction precursors in order to produce or enhance a reaction.

19. The apparatus according to claim 18 wherein said additional reaction precursors includes electrons, ions, photons, positrons, or gases.

20. The apparatus according to claim 16 wherein the RF ion guide in said reaction cell is a multipole RF ion guide.

21. The apparatus according to claim 20 wherein said multipole RF ion guide is a segmented multipole RF ion guide which includes a pre-selected number of multipole ion guide segments, wherein said voltage source includes a DC voltage source for applying a pre-selected electrostatic DC potential to each segment and said voltage source includes an RF voltage source for applying an RF voltage to each multipole ion guide segment to produce said confining potential field.

22. The apparatus according to claim 1 wherein reaction cell includes a non-reactive gas in addition to the reactive gas.

23. The apparatus according to claim 7 wherein said radio frequency (RF) ion guide is a first radio frequency (RF) ion guide, wherein the energy reducing means includes a second radio frequency (RF) ion guide located in an ion guide enclosure having an entrance and exit and being located downstream of said first radio frequency (RF) ion guide, wherein the second RF ion guide includes a voltage source for applying a pre-selected electrostatic DC potential and an RF field to said second RF ion guide for producing a confining potential field, and wherein said ion guide enclosure contains a non-reactive gas for further reducing or controlling the kinetic energy of the ions.

24. The apparatus according to claim 23 including a third radio frequency (RF) ion guide located in said reaction cell, wherein said third RF ion guide includes a voltage source for applying a pre-selected electrostatic DC potential and an RF field to said third ion guide for producing a confining potential field.

25. The apparatus according to claim 24 wherein said first, second and third RF ion guides are multipole RF ion guides.

26. The apparatus according to claim 25 wherein said first, second and third multipole RF ion guides are segmented multipole RF ion guides each including a pre-selected number of multipole ion guide segments, and wherein said voltage sources for applying a pre-selected electrostatic DC potential and an RF field to said first, second third ion guides applies a pre-selected electrostatic DC potential and an RF field to each segment of said multipole ion guide segments of each of said first, second and third ion guides to produce said confining potential field.

27. The apparatus according to claim 26 wherein said DC voltage source for applying a pre-selected electrostatic DC potential to each multipole ion guide segment of said second multipole ion guide is referenced to said DC voltage source for applying a pre-selected electrostatic DC potential to each multipole ion guide segment of each of said third multipole RF ion to provide a pre-selected reaction energy.

28. The apparatus according to claim 27 whereby the pre-selected reaction energy is ramped across one or more ranges.

29. The apparatus according to claim 24 wherein said housing includes at least one guiding means located between said exit of said enclosure of said second ion guide and said entrance of said reaction cell for guiding said beam of ions.

30. The apparatus according to claim 29 wherein said at least one guiding means is one of an electrostatic lenses and a fourth multipole RF ion guide.

31. The apparatus according to claim 23 wherein said ion guide enclosure includes a chamber portion and opposed end plates with one located at each end of said chamber portion, said end plates being electrically isolated from said chamber portion, said opposed end plates having apertures therein with said apertures being aligned along an axis of said chamber defining an axis of said beam of ions, one of said apertures being said entrance to said ion guide enclosure and the other aperture being said exit from said ion guide enclosure, and including an additional power supply configured to apply pre-selected potentials to said opposed end plates.

32. The apparatus according to claim 24 wherein said first radio frequency (RF) ion guide, said second radio frequency (RF) ion guide located in said ion guide enclosure and said reaction cell are mounted in said housing, including pumping means for producing a vacuum in said housing.

33. The apparatus according to claim 24 wherein said reaction cell includes a chamber portion and opposed end plates with an end plate located at each end of said chamber portion, said end plates being electrically isolated from said chamber portion, said opposed end plates having apertures therein with said apertures being aligned along an axis of said chamber defining an axis of said beam of ions, one of said apertures being said entrance to said reaction cell and the other aperture being said exit from said reaction cell, and including an additional power supply configured to apply pre-selected potentials to said opposed end plates, and wherein said end plates are configured to serve as entrance and exit lenses for guiding said ion beam entering and exiting said ion guide enclosure and said reaction cell.

34. The apparatus according to claim 33 wherein said additional power supply is configured for applying trapping and ejection voltage waveforms to said one or both off said end plates of said reaction cell.

35. The apparatus according to claim 31 wherein said additional power supply is configured for applying trapping and ejection voltage waveforms to said one or both off said end plates of said ion guide enclosure.

36. The apparatus according to claim 33 wherein said voltage sources for applying a pre-selected electrostatic DC potential and an RF field to said second and third ion guides are configured to apply trapping and ejection voltage waveforms in a synchronized fashion to said entrance and exit of said ion guide enclosure and said reaction cell.

37. The apparatus according to claim 24 including a mass selector located in said housing downstream of said reaction cell for filtering ions of preset mass number and directing them to said outlet of said housing.

38. The apparatus according to claim 37 including a gap electrode located downstream of said mass selector for re-accelerating the ions in the ion beam to pre-selected average kinetic energy levels.

39. The apparatus according to claim 2, inserted into an accelerator mass spectrometer, said accelerator mass spectrometer including an ion source for producing the beam of ions containing analyte ions, a magnetic filter for filtering ions having a pre-set mass number (mass/charge) among those ions generated by the ion source to pass through the magnet, said inlet of said housing being positioned to receive the filtered beam of ions containing the analyte ions and their isobars, said housing including energy increasing means located downstream of said reaction cell and mass separator at said exit for re-accelerating the ions in the ion beam to pre-selected average kinetic energy levels for injection into an accelerator and high energy analysis section, and a detection means positioned downstream from said exit of the first housing for destruction of any remaining molecular isobars and the provision of low dark current analyte ion detection.

40. The apparatus according to claim 39 wherein said ion source is selected from group consisting of sputter sources, electron cyclotron resonance sources and compact microwave sources.

41. The apparatus according to claim 12 wherein additional mass selective excitation means is applied to said multipole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

42. The apparatus according to claim 12 wherein said multipole RF ion guide is a quadrupole RF ion guide.

43. The apparatus according to claim 42 wherein additional mass selective excitation means is applied to said quadrupole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

44. The apparatus according to claim 13 wherein additional mass selective excitation means is applied to said segmented multipole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

45. The apparatus according to claim 13 wherein said multipole RF ion guide is a quadrupole RF ion guide.

46. The apparatus according to claim 45 wherein additional mass selective excitation means is applied to said quadrupole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

47. The apparatus according to claim 16 wherein additional mass selective excitation means is applied to said multipole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

48. The apparatus according to claim 16 wherein said multipole RF ion guide is a quadrupole RF ion guide.

49. The apparatus according to claim 45 wherein additional mass selective excitation means is applied to said quadrupole RF ion guide to one or more of pre-select an m/z of the ion beam, cause mass-selective ejection, mass-selective collision-induced dissociation, and mass-selective RF heating, further pre-select an m/z of the ion beam selective excitation means includes any one or combination of resonant excitation, boundary-activated excitation, and RF/DC filtering.

50. The apparatus according to claim 20 wherein additional mass selective excitation means is applied to said multipole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

51. The apparatus according to claim 20 wherein said multipole RF ion guide is a quadrupole RF ion guide.

52. The apparatus according to claim 51 wherein additional mass selective excitation means is applied to said quadrupole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

53. The apparatus according to claim 25 wherein additional mass selective excitation means is applied to said second and third multipole RF ion guides to further one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

54. The apparatus according to claim 25 wherein said second and third multipole RF ion guides are quadrupole RF ion guide.

55. The apparatus according to claim 54 wherein additional mass selective excitation means is applied to said second and third quadrupole RF ion guides to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

56. The apparatus according to claim 31 wherein additional mass selective excitation means is applied to said fourth multipole RF ion guides to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

57. The apparatus according to claim 31 wherein said fourth multipole RF ion guide is a quadrupole RF ion guide.

58. The apparatus according to claim 57 wherein additional mass selective excitation means is applied to said fourth quadrupole RF ion guide to one or more of pre-select an m/z of the ion beam, cause mass-selective ejection, mass-selective collision-induced dissociation, and mass-selective RF heating, wherein said additional mass selective excitation means includes any one or combination of resonant excitation, boundary-activated excitation, and RF/DC filtering.

59. The apparatus according to claim 1 wherein said housing includes precursor reaction means for introducing precursor reactions to enhance the selective reactions in the reaction cell, including an inlet for introducing electrons, ions, photons, positrons, or gases.

60. The apparatus according to claim 24 wherein said DC voltage source for applying a pre-selected electrostatic DC potential to said second ion guide is referenced to said DC voltage source for applying a pre-selected electrostatic DC potential to said third RF ion to provide a pre-selected reaction energy.

61. The apparatus according to claim 60 whereby the pre-selected reaction energy is ramped across one or more ranges.

62. A method for separation of analyte ions from isobars, comprising the steps of:
  a) producing an ion beam containing analyte ions;
  b) reducing a akinetic energy of ions in the ion beam to a pre-selected average kinetic energy;
  c) exposing the ion beam to a reactant gas chosen to selectively separate analytes from their isobaric interferences, by one of i) reacting said isobars present in the ion beam thereby depleting the isobars with respect to the analyte ions in the ion beam and ii) by reacting said analytes thereby shifting their mass-to-charge to a value away from a mass-to-charge value of said isobar; and
  d) detecting said analyte ions.

63. The method according to claim 62 wherein said step of reducing the kinetic energy of ions in the ion beam to a pre-selected average kinetic energy includes decelerating the ions in an electric field.

64. The method according to claim 62 wherein said step of reducing a kinetic energy of ions in the ion beam to a pre-selected average kinetic energy includes exposing the ion beam to a non-reactive gas while radially confining the ion beam whereby energy transfer collisions occur between the ions and the non-reactive gas.

65. The method according to claim 62 wherein said step reducing a kinetic energy of ions in the ion beam to a pre-selected average kinetic energy includes reducing the kinetic energy of the beam of ions having an initial kinetic energy in a range of 100 eV to 100 KeV.

66. The method according to claim 62 wherein the analyte ions are radioactive isotopes.

67. The method according to claim 62 wherein the non-reactive gas and the reactant gas are contained in a common volume.

68. The method according to claim 62 wherein the non-reactive gas is contained in a first volume located upstream of the reactive gas contained in a second volume.

69. The method according to claim 62 wherein said step of analyzing said analyte ions includes counting said analyte ions.

70. The method according to claim 62 wherein the reaction of the reactive gas with the isobars is one of ion-molecule reactions, ion/atom reactions, ion/ion reactions, ion/electron reactions, ion/positron reactions, and combinations thereof, including charge transfer, charge stripping, collision-induced dissociation and association.

71. The method according to claim 62 wherein after step a) and prior to step b) directing the ion beam through a magnetic filter for selecting ions having a pre-set mass number (mass/charge) among those ions in the ion beam to pass through the magnet, and wherein after step c) including directing the ion beam through a mass separator for removing reaction products produced between the reactive gas and the atomic isobars from the ion beam, and re-accelerating the ions remaining in the ion beam to a pre-selected average kinetic energy and directing the beam of ions depleted of said isobars into a mass spectrometer for analysis of the ions remaining in the beam.

72. The method according to claim 62 wherein the ion beam contains radioactive isotope ions of $^{36}Cl^-$ and its atomic isobar $^{36}S^-$, and wherein the reactive gas is $NO_2$ and the separation of the rare $^{36}Cl^-$ radioactive isotope from its $^{36}S^-$ atomic isobar is accomplished through a reaction given by $$^{36}S^- + NO_2 \rightarrow {}^{36}S + NO_2^-$$

for depleting unwanted $^{36}S^-$ atomic isobar from the ion beam.

73. The method according to claim 62 wherein the ion beam contains molecular anions of strongly bound rare super-anions, and weakly bound isobars of the super-anions, and wherein the reactive gas reacts with the weakly bound isobars thereby removing them from the ion beam.

74. The method according to claim 73 wherein the super-anions are super-halide ions ($XF_n^-$).

75. The method according to claim 74 wherein the molecular anions of strongly bound rare super-halide ions are $BeF_3^-$ and $CaF_3^-$, and the weakly bound isobaric ions are $BF_3^-$ and $KF_3^-$ so that radioactive isotopes $^{10}Be$ and $^{41}Ca$ can be separated from isobars $^{10}B$ and $^{41}K$.

76. The method according to claim 62 wherein the step of producing an ion beam containing analyte ions includes using an ion source selected from group consisting of sputter sources, electron cyclotron resonance sources, compact microwave sources.

77. A method according to claim 62 wherein the analyte ions are cations of $^{14}C$, the reactant gas is hydrogen and the detector is a low dark current detector.

78. A method according to claim 77 where the ion beam containing the $^{14}C$ analyte ions is produced by a compact microwave ion source.

79. The method according to claim 77 wherein the cations of $^{14}C$ originate from pharmaceuticals labelled with $^{14}C$ tracers are dosed into a human patient at very low levels of concentration in a process of microdosing, said $^{14}C$ being obtained from bodily fluids of the human patient.

80. The method according to claim 62 where said step of reducing a kinetic energy of ions in the ion beam to a pre-selected average kinetic energy includes directing said ion beam through one or more radio frequency (RF) ion guides, wherein the one or more RF ion guide include a voltage source to form a retarding axial electrical field for decelerating the ions in the ion beam travelling through the one or more RF ion guides axially in the downstream direction, and wherein the RF ion guide produces an RF field for providing a confining potential field.

81. The method according to claim 80 where said one or more radio frequency (RF) ion guides are multipole RF ion guides.

82. The method according to claim 81 where said one or more multipole RF ion guides each include a pre-selected number of multipole ion guide segments, including applying a pre-selected electrostatic DC potential to each segment in order to form said retarding axial electrical field, and including applying an RF voltage to each multipole ion guide segment to produce said confining potential field.

83. The method according to claim 81 wherein said step of c) of exposing the ion beam to a reactant gas chosen to selectively separate analytes from their isobaric interferences is carried out in one of said one or more multipole RF ion guides which is enclosed in an enclosure.

84. The method according to claim 83 including applying trapping and ejection voltage waveforms to said enclosure of said reaction cell.

85. The method according to claim 82 including referencing a voltage applied to said ion guide enclosed in said enclosure to a voltage applied to a preceding ion guide to provide a pre-selected reaction energy.

86. The method according to claim 85 wherein the pre-selected reaction energy is ramped across one or more ranges.

* * * * *